Oct. 28, 1924.
M. L. BARBEAU ET AL
1,513,084
ADAPTER FOR ECCENTRIC DRIVES, ETC
Filed Dec. 7, 1922
2 Sheets-Sheet 1
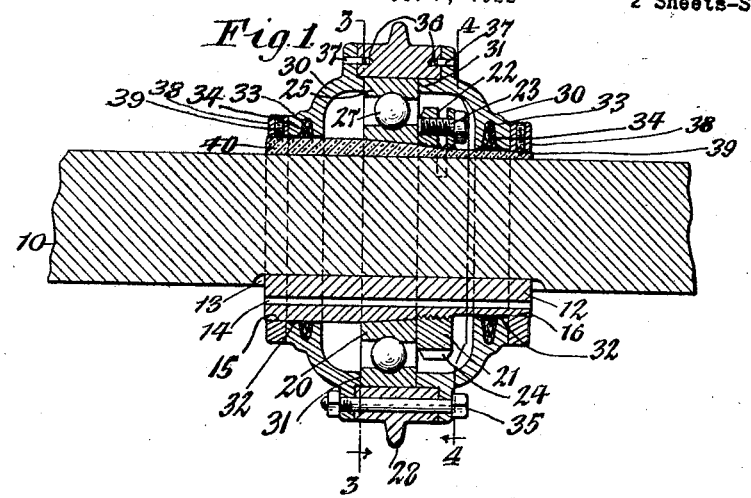
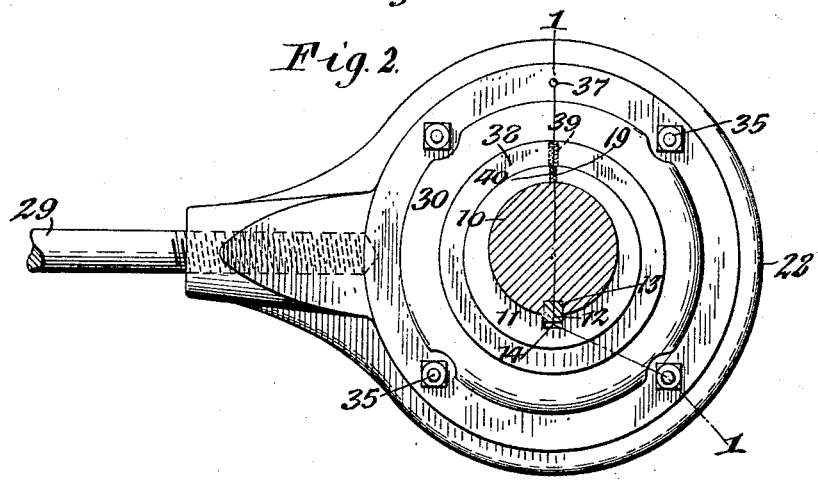
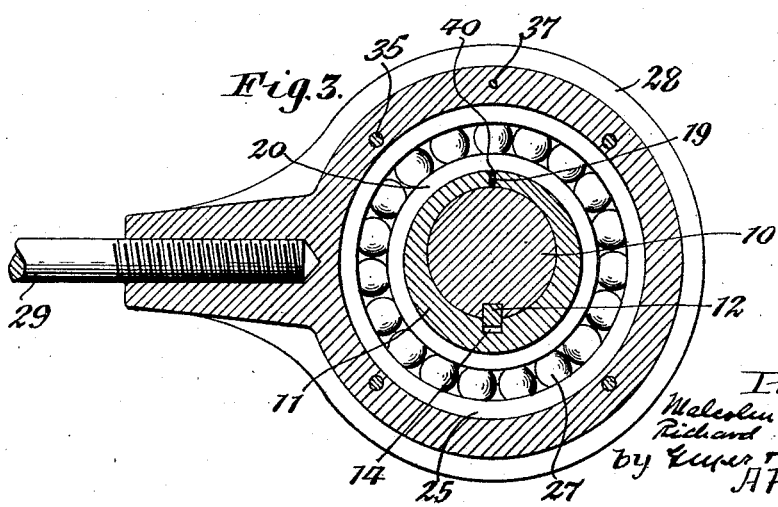

Oct. 28, 1924.  
M. L. BARBEAU ET AL  
1,513,084  
ADAPTER FOR ECCENTRIC DRIVES, ETC  
Filed Dec. 7, 1922   2 Sheets-Sheet 2
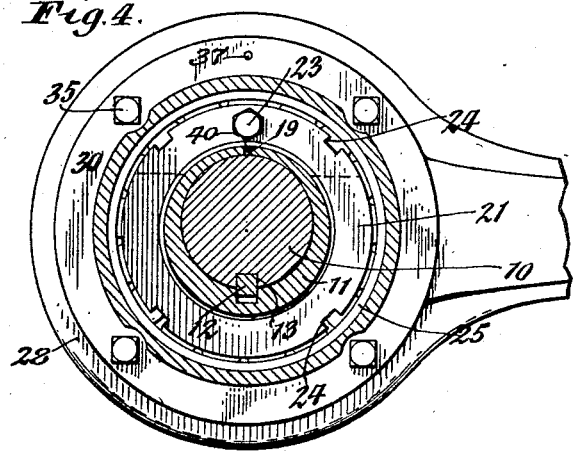
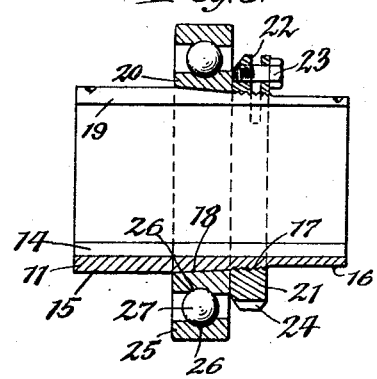
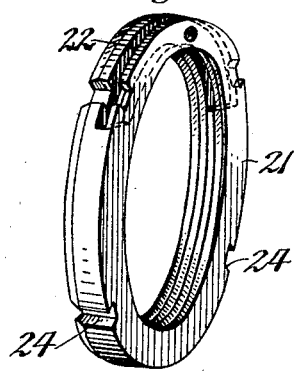
Inventors  
Malcolm L. Barbeau  
Richard Towis  
by Rupert Popp  
Attorneys Patented Oct. 28, 1924.

1,513,084

UNITED STATES PATENT OFFICE.

MALCOLM L. BARBEAU AND RICHARD POWIS, OF SILVER CREEK, NEW YORK, ASSIGNORS TO S. HOWES COMPANY, INC., OF SILVER CREEK, NEW YORK, A CORPORATION OF NEW YORK.

ADAPTER FOR ECCENTRIC DRIVES, ETC.

Application filed December 7, 1922. Serial No. 605,525.

*To all whom it may concern:*

Be it known that we, MALCOLM L. BARBEAU and RICHARD POWIS, citizens of the United States, residing at Silver Creek, in the county of Chautauqua and State of New York, have invented new and useful Improvements in Adapters for Eccentric Drives, &c., of which the following is a specification.

This invention relates to an adapter which is designed to be placed on a shaft for the purpose of supporting or mounting another device on the shaft, and more particularly to an adapter intended for mounting an eccentric driving mechanism on a shaft which is of uniform diameter throughout its length.

In adapters for this general purpose, as heretofore constructed, it has been necessary to reduce one part of the shaft to form a shoulder thereon for engagement with one end of the adapter and also reduce another part and screw thread the same for receiving a nut which engages the other end of the adapter. This not only involved expense in turning down the shaft, but also necessitated locating the adapter at a definite place on the shaft so that great accuracy in preparing the shaft was necessary.

It is the object of this invention to provide an adapter which can be applied to a shaft without requiring a reduction in diameter of any of its parts to permit of securing the adapter thereto and to so organize the adapter that the same may be readily utilized for supporting an eccentric driving mechanism or other device in position for properly co-operating with other parts of the machine in which the same is used.

In the accompanying drawings:

Figure 1 is a longitudinal section of an adapter embodying our invention, showing the manner of utilizing the same for mounting an eccentric driving mechanism on a shaft, the section being taken on line 1—1, Fig. 2. Figure 2 is a side elevation of the same with the shaft in section. Figures 3 and 4 are vertical cross sections of the same taken on the correspondingly numbered lines in Fig. 1. Figure 5 is a fragmentary longitudinal section of the adapter detached from the driving shaft and supporting a ball bearing. Figure 6 is a perspective view of the locking ring forming part of the adapter.

Similar characters of reference indicate corresponding parts throughout the several views.

Although this adapter is capable of use in a variety of installations, the same is shown in the drawings on a shaft 10 which is utilized for operating an eccentric driving mechanism whereby the sieves of a grain cleaning or separating machine are reciprocated or shaken. This shaft is of cylindrical form and of the same diameter throughout its length and journaled on the main frame of the machine by bearings of any approved construction.

Upon this shaft is mounted the adapter which contains the present invention, and in its most practical form the same is constructed as follows:

11 represents a sleeve or tubular body having a cylindrical bore which is adapted to fit over the periphery of the driving shaft and permit of shifting the sleeve lengthwise on the driving shaft to the desired position to properly support other parts of the machine. This sleeve may be held against turning on the shaft by any suitable means, for example, by a key 12 engaging its inner and outer parts with corresponding longitudinal grooves 13, 14, formed respectively on the periphery of the shaft and the bore of the sleeve, as shown in Figs. 1–4. The periphery of the sleeve is eccentric to the axis of its bore and the same is generally of enlarged form at one end and of reduced form at its opposite end.

Specifically the sleeve has its large end provided with a cylindrical surface 15 of comparatively large diameter, its small end has a cylindrical surface 16 of small diameter, adjacent to the inner end of said small cylindrical surface the periphery of the sleeve has an external screw thread 17 and between this screw thread and the inner end of the large cylindrical surface the periphery of the sleeve has a conical surface 18 which tapers from the large end to the small end of the sleeve, as shown in Figs. 1 and 5. The sleeve is provided with a longitudinal slit 19 whereby the same is split from end to end and it is possible to contract the same for clamping the sleeve on the desired part of the shaft. In the preferred construction a key seat 14 is formed in that part of the sleeve having the greatest thickness or eccentricity while the slit 19 is formed in that part which is thinnest or has the least eccentricity.

The sleeve is contracted for the purpose of clamping the same on the shaft by means of a clamping or contracting ring 20 which also forms the inner member of a ball bearing. This inner ring has its bore of conical form and adapted to engage the conical surface of the sleeve so that by moving the bearing ring 20 from the small to the large end of the conical surface of the sleeve the latter will be contracted and grip the periphery of the shaft, whereby these members will be held against moving lengthwise relatively to one another. The clamping or inner bearing ring is moved toward the large end of the cone on the sleeve by a locking ring 21 which has an internal screw thread on its bore which engages the thread on said sleeve, so that upon turning this locking ring in the direction for moving the same inwardly the same will bear against the adjacent side of the inner bearing or clamping ring and cause the same to contract the sleeve and tighten the latter on the shaft. Unscrewing of the locking ring may be prevented by any appropriate means, preferably by splitting a part of the locking ring in a plane at right angles to its axis, as shown at 22 and connecting the parts of this ring on opposite sides of its split by a clamping screw 23 arranged parallel with the axis of this ring, as shown in Fig. 4. Upon tightening the screw 23 the threads on the split parts of the locking ring are pressed sidewise against the threads of the bushing and thus operate to prevent the locking ring from working loose. For convenience in turning the locking ring the same is provided with a plurality of notches 24 in its periphery for the reception of a spanner wrench.

The eccentric driving mechanism whereby motion is transmitted from the driving shaft to the part to be actuated may be constructed in various ways but preferably includes a ball bearing of which the inner ring 20 forms a part. Accordingly, an outer bearing ring 25 is arranged around this inner ring and the opposing surfaces of the same are provided with ball races or grooves 26 which receive an annular row of bearing balls 27. The outer bearing ring is seated with its periphery in an eccentric strap or head 28 which is connected on one side with a connecting rod 29 leading to a part to be reciprocated such as the shaking screen of a grain separator or cleaner.

The surfaces of the rolling bearing are protected from dust or other foreign matter by a housing which in its preferred form comprises two covers or disks 30 of dished form arranged on opposite sides of the eccentric strap and bearing and which have inwardly projecting flanges 31 engaging with opposite sides of the outer bearing ring and the adjacent part of the bore of the eccentric strap and also provided centrally with openings 32 which receive the cylindrical end portions of the sleeve. A dust tight joint is produced between the housing covers 30 and the sleeve by providing the bore of the openings 32 with annular grooves 33 in which are arranged packing rings 34 of felt or the like which engage the cylindrical surfaces of the sleeve. The housing covers are preferably held in place on the eccentric strap by through bolts 35 and in addition the covers are centered relatively to this strap preparatory to attaching these bolts by means of dowels 37 arranged on the housing covers and entering recesses 36 in the sides of the eccentric strap.

Longitudinal movement of the housing and eccentric bearing relative to the shaft is prevented by retaining collars 38 mounted on the cylindrical parts of the sleeve and engaging with the outer sides of the housing covers. These retaining collars are preferably held in place by set screws 39 arranged therein and having pointed inner ends which engage with opposite ends of the slit in the sleeve. In this slit a strip 40 of felt or the like is placed while the sleeve is expanded so that upon subsequently contracting this sleeve the slit therein will be effectually closed by the strip 40 and exclude dust, dirt and grit from the bearing surfaces of the eccentric.

It will be apparent that this adapter permits of readily mounting an eccentric driving mechanism or other device on a driving shaft without necessitating any reduction in diameter in any part of the same and without forming a screw thread therein as has been the custom heretofore. Furthermore, the adapter permits of mounting an eccentric driving mechanism therein with ease and facility and in such a way that all bearing surfaces are effectively protected against dust or particles which would interfere with the free running of the working surfaces.

We claim as our invention:

1. An adapter for mounting a device on a shaft, comprising a longitudinal sleeve adapted to be slid onto a shaft and having its periphery eccentric to the axis of the sleeve and provided with cylindrical ends and an intermediate longitudinally tapering face, an inner bearing ring engaging said tapering surface, an outer bearing ring surrounding the inner bearing ring, a row of bearing balls interposed between said bearing rings, an eccentric strap which receives said outer bearing ring and which is adapted to be connected with the part to be actuated, housing covers secured to opposite sides of said strap and having central openings which receive the cylindrical parts of said sleeve, and retaining collars secured to opposite ends of said sleeve and engaging the outer sides of said housing covers.

2. An adapter for mounting a device on a shaft, comprising a longitudinal sleeve adapted to be slid onto a shaft and having its periphery eccentric to the axis of the sleeve and provided with cylindrical ends and an intermediate longitudinally tapering face, an inner bearing ring engaging said tapering surface, an outer bearing ring surrounding the inner bearing ring, a row of bearing balls interposed between said bearing rings, an eccentric strap which receives said outer bearing ring and which is adapted to be connected with the part to be actuated, housing covers secured to opposite sides of said strap and having central openings which receive the cylindrical parts of said sleeve, retaining collars secured to opposite ends of said sleeve and engaging the outer sides of said housing covers, and set screws arranged on said collars and engaging with said sleeve.

3. An adapter for mounting a device on a shaft, comprising a longitudinal sleeve adapted to be slid onto a shaft and having its periphery eccentric to the axis of the sleeve and provided with cylindrical ends and an intermediate longitudinally tapering face, an inner bearing ring engaging said tapering surface, an outer bearing ring surrounding the inner bearing ring, a row of bearing balls interposed between said bearing rings, an eccentric strap which receives said outer bearing ring and which is adapted to be connected with the part to be actuated, and housing covers secured to opposite sides of said strap and having central openings which receive the cylindrical parts of said sleeve.

MALCOLM L. BARBEAU.
RICHARD POWIS.